(12) United States Patent
Jordan et al.

(10) Patent No.: US 12,073,293 B2
(45) Date of Patent: Aug. 27, 2024

(54) MACHINE LEARNING MODEL EVALUATION IN CYBER DEFENSE

(71) Applicant: Resurgo, LLC, Honolulu, HI (US)

(72) Inventors: Eamon Hirata Jordan, Honolulu, HI (US); Chad Kumao Takahashi, Honolulu, HI (US); Ryan Susumu Ito, Wahiawa, HI (US)

(73) Assignee: Resurgo, LLC, Honolulu, HI (US)

( * ) Notice: Subject to any disclaimer, the term of this patent is extended or adjusted under 35 U.S.C. 154(b) by 648 days.

(21) Appl. No.: 16/937,568

(22) Filed: Jul. 23, 2020

(65) Prior Publication Data

US 2020/0364620 A1 Nov. 19, 2020

Related U.S. Application Data

(62) Division of application No. 15/373,425, filed on Dec. 8, 2016, now Pat. No. 10,733,530.

(51) Int. Cl.
| | |
|---|---|
| *G06N 20/00* | (2019.01) |
| *G06F 21/55* | (2013.01) |
| *G06N 7/01* | (2023.01) |
| *H04L 9/40* | (2022.01) |
| *H04L 43/08* | (2022.01) |
| *H04L 43/16* | (2022.01) |

(52) U.S. Cl.
CPC ........... *G06N 20/00* (2019.01); *G06F 21/552* (2013.01); *G06N 7/01* (2023.01); *H04L 43/08* (2013.01); *H04L 43/16* (2013.01); *H04L 63/1425* (2013.01)

(58) Field of Classification Search
CPC ...... G06N 20/00; G06N 7/005; G06F 21/552; H04L 43/08; H04L 43/16; H04L 63/1425
See application file for complete search history.

(56) References Cited

U.S. PATENT DOCUMENTS

| | | | |
|---|---|---|---|
| 2005/0192824 A1* | 9/2005 | Schuetze ................. | G06F 16/35 706/20 |
| 2014/0283052 A1* | 9/2014 | Jordan .................. | G06F 21/552 726/23 |

OTHER PUBLICATIONS

Akoglu et al. ("Fast and Reliable Anomaly Detection in Categorical Data", CIKM'12, 2012, pp. 415-424) (Year: 2012).*
Khamassi et al. ("Drift detection and monitoring in non-stationary environments", 2014 IEEE Conference on Evolving and Adaptive Intelligent Systems, 2014, pp. 1-6) (Year: 2014).*
Xu et al. ("Survey of model selection and model combination." Available at SSRN 1742033, 2008, pp. 1-39) (Year: 2008).*
Haque, Ahsanul, et al. ("Adaptive Framework for Classification and Novel Class Detection over Evolving Data Streams with Limited Labeled Data,". No. SAND-2015-7513J. Sandia National Lab.(SNL-NM), Albuquerque, NM (United States), 2015, pp. 1-14) (Year: 2015).*
Chandola, Varun, Arindam Banerjee, and Vipin Kumar. "Anomaly detection: A survey." ACM computing surveys (CSUR) 41, No. 3 (2009): 1-58. (Year: 2009).*
Hastie, Trevor, Robert Tibshirani, Jerome H. Friedman, and Jerome H. Friedman. The elements of statistical learning: data mining, inference, and prediction. vol. 2. New York: springer, 2009. 763 pages. (Year: 2009).*

(Continued)

*Primary Examiner* — Vincent Gonzales
(74) *Attorney, Agent, or Firm* — Martin E. Hsia

(57) ABSTRACT

Testing machine learning sensors by adding obfuscated training data to test data, and performing real time model fit analysis on live network traffic to determine whether to retrain.

1 Claim, 1 Drawing Sheet

(56) References Cited

OTHER PUBLICATIONS

Keally, Matthew, Gang Zhou, Guoliang Xing, David T. Nguyen, and Xin Qi. "A learning-based approach to confident event detection in heterogeneous sensor networks." ACM Transactions on Sensor Networks (TOSN) 11, No. 1 (2014): 1-28. (Year: 2014).*

* cited by examiner

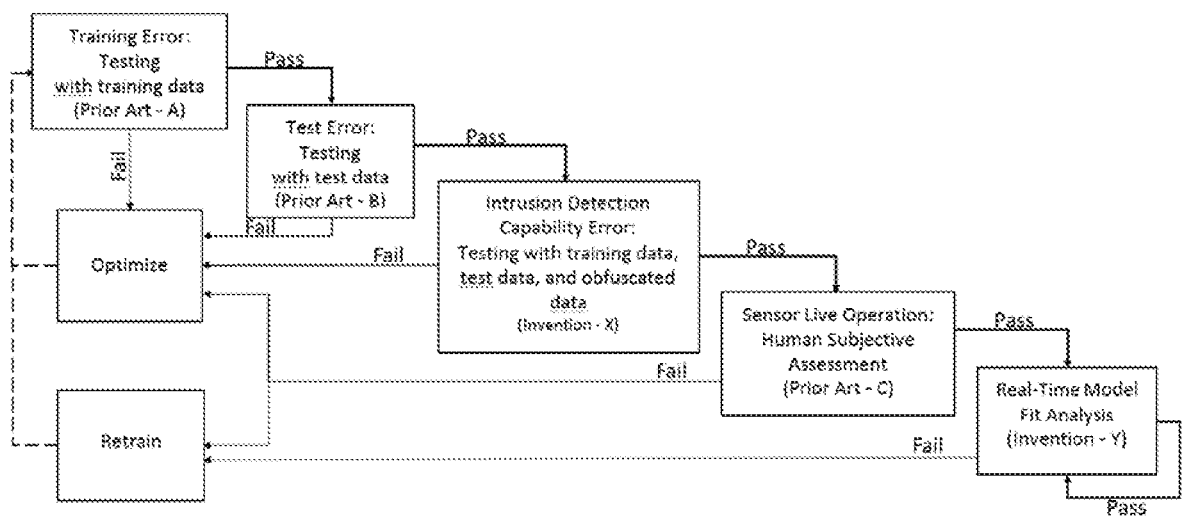

MACHINE LEARNING MODEL EVALUATION IN CYBER DEFENSE

This application is a divisional of U.S. patent application Ser. No. 15/373,425, now U.S. Pat. No. 10,733,530, which is incorporated herein by reference.

TECHNICAL FIELD

The present invention relates to evaluation of machine learning models that are used in sensors for defending computer networks against cyber attacks. The invention is also applicable to any other fields in which machine learning sensors are used to detect obfuscated abnormal data in sets of data containing both normal and abnormal data, such as in so-called data mining and "big data", including bioinformatics, financial analysis, forgery detection, and other fields.

BACKGROUND ART

Intrusion detection for cyber defense of networks (defense of computer networks against cyber attacks) has two main pitfalls that result in malicious penetration: computer networks are always evolving, resulting in new, unknown vulnerabilities that are subject to new attacks, and hackers are always obfuscating known (legacy) attack delivery methods to bypass security mechanisms. Intrusion detection sensors that utilize machine learning models are now being deployed to identify these new attacks and these obfuscated legacy attack delivery methods (Peter, M., Sabu, T., Zakirul, B., Ryan, K., Robin, D., & Jose, C., "Security in Computing and Communications", 4th International Symposium, SSCC 2016 (p. 400). Jaipur, India: Springer (2016), incorporated herein by reference, and U.S. Pat. No. 8,887,285 to Resurgo entitled "Heterogeneous Sensors for Network Defense", incorporated herein by reference).

State-of-the-art machine learning model evaluation uses statistical analysis to determine model fit for a particular set of data. This works well for typical uses of machine learning (e.g. speech recognition, weather forecasting), but fails to meet cyber defense standards when using machine learning models to detect cyber attacks on networks. Currently, statistical analysis of cyber defense models (machine learning models for defense against cyber attacks) does not test for obfuscated attacks, and is only applied to archived data sets, not to (1) real-time, evolving network traffic; or (2) real-time attack detection.

A. Background of Obfuscation to Thwart Cyber Defense

Cyber attacks, such as malware, should not be thought of as a single unit based on result. Instead, cyber attacks can be broken into their functional components: propagation (i.e. attack delivery) method, exploit, and payload (Herr, T., "PrEP: A Framework for Malware & Cyber Weapons", George Washington University, Political Science Department & Cyber Security and Policy Research Institute, Washington DC. (2014), incorporated herein by reference). The propagation (attack delivery) method is the means of transporting malicious code from origin to target. The exploit component takes advantage of vulnerabilities in the target system to enable infection and the operation of the payload. The payload is code written to achieve some desired malicious end, such as deleting data. Using this three-part component framework for analyzing cyber attacks becomes important when trying to detect and protect against cyber attacks. Many signatures (for signature-based intrusion detection systems) are based on the payload portion of the attack, because the propagation method and exploit components can vary substantially from target to target.

U.S. Pat. No. 8,887,285 to Resurgo, incorporated herein by reference, discloses how to combine signature-based and machine learning sensors for a more comprehensive computer network defense. This patent details how to build a data set using detection evasion techniques to train the machine learning sensor to cover the "blind-spot" of the signature-based sensor.

Detection evasion techniques in all fields (not just network security) can include obfuscation, fragmentation, encryption, other ways to change form or add variant forms (sometimes called polymorphous or polymorphic), and other detection evasion techniques, and are all referred to in this specification and claims collectively and singly as "obfuscating", "obfuscation" or "obfuscated attacks".

Detection evasion techniques as applied to network security were described in more detail in the Resurgo patent's background section:

The blind spot problem for signature-based sensors is compounded by the fact that use of evasion techniques by hackers has proven very effective at enabling known exploits to escape detection. Evasion techniques allow a hacker to sufficiently modify the pattern of an attack so that the signature will fail to produce a match (during intrusion detection). The most common evasion techniques are obfuscation, fragmentation, and encryption. Obfuscation is hiding intended meaning in communication, making communication confusing, willfully ambiguous, and harder to interpret. In network security, obfuscation refers to methods used to obscure an attack payload from inspection by network protection systems. For instance, an attack payload can be hidden in web protocol traffic. Fragmentation is breaking a data stream into segments and sending those segments out of order through the computer network. The segments are reassembled in correct order at the receiving side. The shuffling of the order of data stream segments can change the known attack signature due to the reordering of communication bits. Encryption is the process of encoding messages (or information) in such a way that eavesdroppers or hackers cannot read it, but that authorized parties can. Both the authorized sender and receiver must have an encryption key and a decryption key in order to encode and decode communication. In network attacks, the attack payload can often be encoded/encrypted such that the signature is no longer readable by detection systems. While each evasion technique changes the attack pattern differently, it is important to note that the goal is the same: change the attack pattern enough to no longer match published attack signatures and hence to avoid intrusion detection.

Hackers use the above methods, among others, to vary the propagation method, exploit, and payload components to create obfuscated attacks, even though the name of the cyber attack, and its result, may be the same. The process of U.S. Pat. No. 8,887,285 focuses on the training of machine learning models with obfuscated attacks, but does not consider any methods for evaluating the resulting models beyond standard statistical techniques.

U.S. Pat. No. 9,497,204 B2 to UT Battelle, LLC, incorporated herein by reference, and provisional patent application 61/872,047 (from which U.S. Pat. No. 9,497,204 B2 claims priority), incorporated herein by reference, disclose a semi-supervised learning module connected to a network node. The learning module uses labeled and unlabeled data to train a semi-supervised machine learning sensor. However, semi-supervised learning is a model training technique and not appropriate for model performance evaluation or identifying obfuscated attacks.

B. Background of Machine Learning

Learning models, statistical models, analytical models and essentially all mathematical models can be used to explain, predict, automate, and analyze information about the nature of things. Fields of study such as machine learning, statistical analysis, and pattern recognition are actively researching new ways to process and handle datasets. To develop these models, a sufficient supply of samples which have been (to the best of ability) properly labeled (i.e. classified) must be supplied. The correctly labeled (i.e. classified) samples are known as the "ground truths". These samples do not change, so they are static. For machine learning purposes, these samples are not sorted or segregated by their classifications: a set of samples includes both normal network traffic and cyber attacks. The samples of normal network traffic preferably are obtained from the network that is to be protected.

The samples of cyber attacks are preferably also obtained from the network that is to be protected, but if there is an insufficient number of samples of cyber attacks on that network, then some or all of the samples of cyber attacks can be provided from an existing repository of cyber attacks.

At a basic level, samples of ground truths can be split into two different datasets: training set and test set. The training set is a sufficiently large number of samples, which contains a sufficiently large number of ground truths, used to train (i.e. generate models using some model generating algorithm, and then select from those models). The training set is used to tune the parameters of a model generation algorithm (Bishop, C. (n.d.), "Pattern Recognition and Machine Learning", New York: Springer, incorporated herein by reference). In machine learning nomenclature, this is known as the training phase, or learning phase. This training phase involves providing a model generating algorithm with the training data; generating multiple models (that is, generating multiple models using multiple different sets of tuned parameters) that each segregate the training data by label or classification; performing a statistical analysis on the performance of each model (or set of parameters) to determine whether the training data has been accurately segregated; and then selecting the model (or set of parameters) that provides the most accurate segregation, which becomes the trained model.

The multiple different sets of tuned parameters used to generate multiple models are preferably generated by methods such as exhaustive cross-validation, grid search K-fold cross validation, leave-p-out cross-validation, leave-one-out cross-validation, k-fold cross-validation, or repeated random sub-sampling validation.

The training data must have a sufficient number of samples with ground truths (having correct labels or classifications) to train a model that performs well in supervised learning. This is a true statement for all machine learning, however some training techniques try to utilize unlabeled data. Unlabeled data is simply data that has not been classified by an expert and is therefore unknown in content. Supplementing ground truth data with unknown data in the training phase can be a very cost effective approach because creating or classifying ground truths can be an exhaustive process. This approach, called semi-supervised learning, is part of the training phase of machine learning and also disclosed in U.S. Pat. No. 9,497,204 B2 to UT Battelle, LLC, incorporated herein by reference, and provisional patent application 61/872,047 (from which U.S. Pat. No. 9,497,204 B2 claims priority), incorporated herein by reference. Machine learning utilizing only unlabeled data (i.e. no ground truths), also known as unsupervised learning, is closer to anomaly detection but still can be referred to as machine learning. No matter what the percentage of ground truth is used in training, the algorithms work to classify the data based on optimizing parameters.

Different model generating algorithms generate models in their own unique ways, such as support vector machine learning algorithms. A support vector machine learning algorithm labels or classifies training data by finding the best separating hyperplane (where hyperplane is a point, line, plane, or volume, depending on the number of dimensions) in a multidimensional space into which the training data has been mapped, separating the space into two or more parts, with each part corresponding to a label or class of the ground truths of the training data. Optionally, support vector machine learning algorithms have tunable parameters which can be adjusted to alter how ambiguous data points are labelled or classified. A support vector machine learning algorithm generates a mathematical model which can assign or determine classifications of new data based on the classifications determined during training (Burges, C., "A Tutorial on Support Vector Machines for Pattern Recognition", *Data Mining and Knowledge Discovery*, 121-167 (1998), incorporated herein by reference). Other model generating algorithms, such as Logistic Regression, Decision Trees, Naïve Bayes, Random Forests, Adaboost, Neural Networks, and K-Means Clustering, similarly generate models that segregate training data into patterns, which can allow labeling or classification of data.

In machine learning, a trained algorithm will output a model that is useful to make better decisions or predictions, discover patterns in data, or describe the nature of something. Generally, the model generation algorithms are designed to minimize an error equation or optimize some other model parameters. The error rate of a model evaluated on a training set is known as the training error.

The second set of samples containing ground truths is referred to as the test set. The test set may include the remaining ground truths that were not used in the training set, or only a random portion of the remaining ground truths. The model's performance is evaluated on the test set by measuring the error of the test set. This is known as test error (Friedman, J., Tibshirani, R., & Hastie, T., "The Elements of Statistical Learning", New York: Springer (2001), incorporated herein by reference). The test error of a model is determined by the same methods as the training error. A test set is important because it determines the model's ability to perform on new data (data that did not train the model). In most applications, comparing test error of different generated models allows selecting an optimal model for real-world application.

C. Background of Machine Learning in Cyber Defense

Once cyber defense machine learning models/sensors graduate from the previously described static data testing, they are inserted onto actual computer networks that need cyber defense. At this point, the statistical predictive or determinative calculations that were used previously no longer apply. The predictive or determinative calculations of training errors and test errors only work with a given data set containing ground truths. Actual computer network traffic has no ground truths (because it has not been previously classified) or answer keys, and therefore no means by which to assess the fit of the machine learning model. Model fit testing (i.e. goodness of fit) is still required though, because cyber networks can change overnight or over a prolonged timeframe, thus requiring periodic model retraining. In machine learning, model retraining is effectively starting from scratch, and requires building a brand new data set with ground truths (from which new training data and new test data can be obtained) for training and testing, which can be so burdensome as to prohibit using machine learning sensors at all.

Model fit, referred to as goodness of fit, is how well a trained model does its designed task (e.g. predicts, determines, decides, classifies, or any other model performing function). Model fit traditionally has been calculated with different techniques such as chi-squared test, Kolmogorov-Smirnov test, coefficient of determination, lack of fit sum of squares, etc. The essence of these techniques is to obtain a value that describes the model fit and to compare that to some desired confidence value (i.e. a model fit value that is better than the desired confidence value is determined to be a good fit for the given data). Model fit can also be determined by the test set error relative to some desired confidence value (i.e. if the model produces a low test error when given a test set, then the model may be a good fit). Of course, model fit has to be recalculated for any new data with ground truths because model fit is relative to a static data set.

In current practice, model fit analysis on live networks does not take place, and model retraining is triggered by human subjective assessment based on observables, including the following:

Machine learning model output (i.e. attack alert log) quantity becomes too great for human analysis. In other words, the model alerts on attacks (or false attacks) too often for human analysts to be able to research or react to every alert. Model retraining is implemented to reduce the quantity of alerts.

Forensic analysis of the network traffic (sometimes initiated by the machine learning model's alert logs) determines that the machine learning model had false-positives. In sensing, false-positive alerts are those in which the sensor (or model) indicates an event when none really occurred. Model retraining is enacted as a reactionary step to reduce the quantity of false-positives.

Forensic analysis of the network traffic (sometimes initiated by a signature-based sensor alert or by a network disruption) determines that the machine learning model had false-negatives. In sensing, false-negatives are a lack of alert when an event actually occurred. Model retraining is enacted as a reactionary step to reduce the quantity of false-negatives.

These three current methods for determining the need for model retraining are based on human subjective assessment and not on actual model fit to the data (actual network traffic). As a result, decisions are being made in machine learning cyber defense without appropriate context and without knowledge of the cyber defense implications. For example, if hackers know a network is employing machine learning sensors, they could create attacks that generate a large quantity of alerts. The sudden increase and sheer quantity of alerts would cause the analysts to request model retraining while they either ignore the machine learning alerts or set them aside for retroactive, forensic analysis. With the machine learning sensing being ignored, the hackers could then be free to go after their primary goal, until the model has been retrained and reinstalled in the network.

D. Need For A New Validation Test for Pre-Deployment (i.e. Laboratory) Model Fit Testing Because most cyber network attacks from sophisticated actors (i.e. the really dangerous hackers) are actually the obfuscated type (Du, H., "Probabilistic Modeling and Inference for Obfuscated Network Attack Sequences", Thesis, Rochester Institute of Technology (2014), incorporated herein by reference), it was realized that conventional methods of model evaluation, training and test errors, were inadequate for intrusion detection. Conventional use of training errors and test errors only considers trained (attacks based on training data) and untrained attacks (attacks not based on training data), while cyber defense model fit testing must include trained, untrained, and obfuscated attacks (attacks based on training data that has been obfuscated), for a more accurate prediction of model performance on actual cyber networks.

Conventional model testing considers obfuscated attacks to be part of untrained test data. However, this skews test error results because these attacks were not truly untrained data points. Effectively, the attacks were indeed used in model training, just not those obfuscated instances of the attacks. An example: a buffer overflow of a website input field is used in training, but an obfuscated version uses fragmentation of the communication stream to reorder the packets of the very same attack. Conventional model testing would consider the obfuscated attack as part of untrained (or new) data. However this categorization is not valid for cyber network defense because hackers have countless methods for obfuscating known attacks: the known attacks can take many different forms, that is, they can be polymorphous or polymorphic. In cyber intrusion detection, machine learning model fit analysis needs to consider training errors and test errors for the following types of attacks:

Known attacks contained in training data;

Zero-day attacks or unknown attacks, unrelated to training data; and

Obfuscated (including polymorphous or polymorphic) attacks that are similar in propagation method, exploit, or payload components to training data. Example: a trained attack contains a website user input field (propagation method), buffer overflow (exploit), and a trojan (payload); an obfuscated attack could contain the same website user input field and buffer overflow exploit, but contain a different payload such as a virus.

DISCLOSURE OF THE INVENTION

The present invention includes a process for improving a machine learning sensor for defending a computer network, comprising:

obtaining samples of normal network traffic from the network;

providing samples of cyber attacks from the network or from a repository of cyber attacks;

classifying each of the samples as either the normal network traffic or the cyber attacks, to create ground truths for the samples;

splitting the samples into a training set and a test set, with each of the sets containing samples of the normal network traffic and of the cyber attacks;

using a model generating algorithm to generate a variety of models for distinguishing between the normal network traffic and the cyber attacks in the training set;

obfuscating a portion of samples of the cyber attacks in the training set to create obfuscated attack samples;

adding the obfuscated attack samples to the test set to form an enhanced test set;

performing statistical analysis on performance of the models with the enhanced test set to determine intrusion detection capability error;

selecting based on the intrusion detection capability error one of the models that optimizes a desired model parameter as an optimal model for distinguishing between the normal network traffic and the cyber attacks; and installing the optimal model in the sensor.

Optionally, the process further includes:

determining model fit of the sensor by applying anomaly detection, measuring similarity between live network traffic and the training set, and determining model overfit;

assigning thresholds and aggregating results of the thresholds to identify model fit in real time on a scale of model fits; and activating model retraining based on the scale of model fits.

Optionally, the intrusion detection capability error is the sum of the following:

ratio of misclassified known attacks to total misclassified attacks, multiplied by test error of known attacks;

ratio of misclassified unknown attacks to total misclassified attacks, multiplied by test error of unknown attacks; and ratio of misclassified obfuscated attacks to total misclassified attacks, multiplied by test error of obfuscated attacks.

The invention also includes a process for improving sensors using machine learning models for defending a computer network, comprising:

installing the sensors in the computer network;

determining model fit of the models by applying techniques of anomaly detection, measuring similarity between live network traffic and training data, and determining model overfit;

assigning thresholds and aggregating results of the thresholds for each of the techniques, to identify model fit in real time on a scale of model fits; and activating model retraining based on the scale of model fits.

Preferably, the step of determining of model fit is performed using a technique selected from the group consisting of chi-squared test, Kolmogorov-Smirnov test, coefficient of determination, and lack of fit sum of squares.

Preferably also, the step of determining model fit is performed using generalization complexity measures selected from the group consisting of Rademacher Complexity, Kolmogorov Complexity, and Vapnik Chervonenkis Entropy.

Preferably also, the step of assigning thresholds on a scale of model fits is performed using a scale of model fits in which:

model fit is determined to be good if all three of the techniques are below said thresholds;

model fit is determined to be deteriorating if one of the three is above said threshold;

model fit is determined to be lacking if two of the three are above said threshold;

model fit is determined to be extremely lacking if all of the three are above the threshold.

Preferably also, the activating of model retraining step is based on the aggregate of the goodness of model fit measurements for all 3 of said techniques.

Alternatively, the activating of model retraining is based on goodness of model fit for only one of the techniques.

Preferably, the selecting step is performed using a desired model parameter selected from the group consisting of intrusion detection capability error and test error.

The invention also includes a system, comprising:

a network of computers; and a machine-learning based sensor deployed in the network, wherein the machine-learning based sensor has been trained by a process comprising:

obtaining samples of normal network traffic from the network;

providing samples of cyber attacks from the network or from a repository of cyber attacks;

classifying each of the samples as either the normal network traffic or the cyber attacks, to create ground truths for the samples;

splitting the samples into a training set and a test set, with each of the sets containing samples of the normal network traffic and of the cyber attacks;

using a model generating algorithm to generate a variety of models for distinguishing between the normal network traffic and the cyber attacks in the training set;

obfuscating a portion of samples of the cyber attacks in the training set to create obfuscated attack samples;

adding the obfuscated attack samples to the test set to form an enhanced test set;

performing statistical analysis on performance of the models with the enhanced test set to determine intrusion detection capability error;

selecting based on the intrusion detection capability error one of the models that optimizes a desired model parameter as an optimal model for distinguishing between the normal network traffic and the cyber attacks.

Preferably, the selecting step is performed using a desired model parameter selected from the group consisting of intrusion detection capability error and test error.

The invention further includes a computer program product stored in a computer readable medium for protecting a network, comprising:

a machine learning based sensor that has been trained by a process comprising:

obtaining samples of normal network traffic from the network;

providing samples of cyber attacks from the network or from a repository of cyber attacks;

classifying each of the samples as either the normal network traffic or the cyber attacks, to create ground truths for the samples;

splitting the samples into a training set and a test set, with each of the sets containing samples of the normal network traffic and of the cyber attacks;

using a model generating algorithm to generate a variety of models for distinguishing between the normal network traffic and the cyber attacks in the training set;

obfuscating a portion of samples of the cyber attacks in the training set to create obfuscated attack samples;

adding the obfuscated attack samples to the test set to form an enhanced test set;

performing statistical analysis on performance of the models with the enhanced test set to determine intrusion detection capability error;

selecting based on the intrusion detection capability error one of the models that optimizes a desired model parameter as an optimal model for distinguishing between the normal network traffic and the cyber attacks.

The invention further includes a process for improving a machine learning sensor, comprising:

obtaining samples of normal data from a set of data containing normal and abnormal data;

providing samples of abnormal data from the set or from a repository of abnormal data;

classifying each of the samples as either the normal data or the abnormal data, to create ground truths for the samples;

splitting the samples into a training set and a test set, with each of the sets containing samples of the normal data and of the abnormal data;

using a model generating algorithm to generate a variety of models for distinguishing between the normal data and the abnormal data in the training set;

obfuscating a portion of samples of the abnormal data in the training set to create obfuscated abnormal data samples;

adding the obfuscated abnormal data samples to the test set to form an enhanced test set;

performing statistical analysis on performance of the models with the enhanced test set to determine intrusion detection capability error;

selecting one of the models that optimizes a desired model parameter as an optimal model for distinguishing between the normal data and the abnormal data; and installing the optimal model in the sensor.

The invention further includes a system, comprising:

a computer; and a machine-learning based sensor deployed in the computer, wherein the machine-learning based sensor has been trained by a process comprising:

obtaining samples of normal data from a set of data containing normal and abnormal data;

providing samples of abnormal data from the set or from a repository of abnormal data;

classifying each of the samples as either the normal data or the abnormal data, to create ground truths for the samples;

splitting the samples into a training set and a test set, with each of the sets containing samples of the normal data and of the abnormal data;

using a model generating algorithm to generate a variety of models for distinguishing between the normal data and the abnormal data in the training set;

obfuscating a portion of samples of the abnormal data in the training set to create obfuscated abnormal data samples;

adding the obfuscated abnormal data samples to the test set to form an enhanced test set;

performing statistical analysis on performance of the models with the enhanced test set to determine intrusion detection capability error;

selecting one of the models that optimizes a desired model parameter as an optimal model for distinguishing between the normal data and the abnormal data; and installing the optimal model in the computer.

The invention further includes a computer program product stored in a computer readable medium, comprising:

a machine learning based sensor that has been trained by a process comprising:

obtaining samples of normal data from a set of data containing normal and abnormal data;

providing samples of abnormal data from the set or from a repository of abnormal data;

classifying each of the samples as either the normal data or the abnormal data, to create ground truths for the samples;

splitting the samples into a training set and a test set, with each of the sets containing samples of the normal data and of the abnormal data;

using a model generating algorithm to generate a variety of models for distinguishing between the normal data and the abnormal data in the training set;

obfuscating a portion of samples of the abnormal data in the training set to create obfuscated abnormal data samples;

adding the obfuscated abnormal data samples to the test set to form an enhanced test set;

performing statistical analysis on performance of the models with the enhanced test set to determine intrusion detection capability error;

selecting one of the models that optimizes a desired model parameter as an optimal model for distinguishing between the normal data and the abnormal data.

BRIEF DESCRIPTION OF DRAWINGS

FIG. 1 is a flow diagram showing the steps of the present invention.

BEST MODE FOR CARRYING OUT THE INVENTION

The presently preferred best mode for practicing the present invention is presently illustrated by way of example in FIG. 1, which shows a new method (steps A, B, X, C, Y in FIG. 1) for evaluating machine learning model fit that adds two revolutionary steps (X and Y) to the steps of the prior art process (A, B, and C). Steps X and Y fill current model evaluation voids in that step X includes model evaluation using obfuscated attacks, while step Y introduces model evaluation using real-time network traffic.

In step X, after initial data is split into trained and untrained (i.e. known and unknown attacks, that is, training and test data) for model training, which is prior art, a sampling of evasion techniques is then used to obfuscate the training data attacks, to create obfuscated training data. Those obfuscated attacks in obfuscated training data are then added to the test data with the end result being an enhanced set of test data that now includes known, unknown, and obfuscated attacks (from test data and obfuscated training data).

A validation test then preferably calculates "Intrusion Detection Capability Error" because the test is more accurate for real-time operation of the machine learning model. Intrusion Detection Capability Error analyzes all categories of attack, including obfuscated attacks (which are overlooked in conventional testing):

Intrusion Detection Capability Error=$\alpha$*Test Error [Known Attacks]+$\beta$*Test Error [Unknown Attacks]+$\gamma$*Test Error [Obfuscated Attacks]

Where $\alpha$=[Misclassified #Known Attacks]/Misclassified Total #Attacks $\beta$=[Misclassified #Unknown Attacks]/Misclassified Total #Attacks $\gamma$=[Misclassified #Obfuscated Attacks]/Misclassified Total #Attacks The inclusion of obfuscated attacks in the machine learning evaluation process is non-obvious, because new data is created from the training set data to perform model fit analysis with an enhanced test data set.

Conventional methods of evaluation create all data first, then assign most (~70%) as training data, with the rest (~30%) assigned as test data. Creating new data is non-obvious and creating new data that is a variant of training data is counter-intuitive. In conventional model fit analysis, there is no statistical test to account for variant training data (i.e. obfuscated training attacks), and therefore no previous framework for this procedure or its statistical analysis. Hence, using variant training data for statistical analysis is counter-intuitive because it breaks conventional rules of statistics (such as independence of data). Additionally, data is viewed by machine learning experts and statisticians as black or white (i.e. trained or untrained/unknown). There is no prior disclosure or suggestion of manipulating original training data, and then using the manipulated training data, together with the original training data, for machine learning.

Conventional machine learning techniques consider data points permanent and attempt to analyze only those data points. For example, machine learning facial recognition software would consider a person's face as a data point. Drastic changes to a person's face via plastic surgery or mutilation would be uncommon, and the result would be considered a new, untrained data point. By contrast, hackers could morph a cyber data point in innumerable ways, thus requiring a new, counter-intuitive methodology for model fit testing.

In step Y, real-time traffic and model analysis gives a proper quantitative context (i.e. situational awareness) to cyber defense analysts when making model retraining decisions. It is also a new step that extends quantitative analysis into the sensor live operation arena. This quantitative approach, described below, allows for proactive objective management of machine learning models, instead of the retroactive, human subjective assessment that is current state-of-the-art.

Determining model fit on live network models/sensors is non-obvious because conventional model fit testing is done only on static data. Statisticians and machine learning experts would never try to calculate model fit on dynamic, live data, due to the ever-changing baseline and lack of ground truths. Using real-time calculations and comparisons of traffic behaviors to determine model fit is an additional and counter-intuitive step because the results cannot be verified (without static, ground truth data).

To perform real-time traffic evaluation, at least the three following different mathematical techniques that work well with new, live data can be used:

A. Anomaly detection techniques to compare traffic metrics and protocol utilizations from live network traffic to the original model training data.

B. Measuring the similarity between two data sets: live network traffic and the original training data, using the process disclosed in U.S. Pat. No. 8,799,399 (entitled "Device for and Method of Measuring Similarity Between Sets", incorporated herein by reference). A lack of similarity between the two indicates a lack of model fit due to changing network conditions, operating usage, computer architecture, or traffic composition (among others).

C. Determining model overfit of the original training data compared to new datasets from live network traffic, using generalization complexity measures (such as Rademacher Complexity, Kolmogorov Complexity, Vapnik-Chervonenkis Entropy). Model overfitting occurs when a model is too complex compared to the new data, and the predictive performance of the model is poor.

Using at least the above techniques, real-time model fit can be determined by defining a scale of model fits by assigning thresholds for the mathematical techniques of anomaly detection, measuring similarity, and determining model overfit (and optionally other mathematical techniques), and aggregating the results of whether the model is above or below the assigned threshold for each of the mathematical techniques, for example, as follows:

Goodness of Model Fit=0=Below Threshold[$A$]+
Below Threshold [$B$]+Below Threshold[$C$]

Deteriorating Model Fit=1=Above Threshold[$A$]+
Below Threshold [$B$]+Below Threshold[$C$]=Below Threshold[$A$]+Above Threshold [$B$]+Below Threshold[$C$]=etc.

Lack of Model Fit=2=Above Threshold[$A$]+Above
Threshold [$B$]+Below Threshold[$C$]=Above
Threshold [$A$]+Below Threshold [$B$]+Above
Threshold[$C$]=etc.

Extreme Lack of Model Fit=3=Above Threshold[$A$]+
Above Threshold [$B$]+Above Threshold[$C$]

Each of these mathematical techniques can be considered to be a dimension of model fit, so that this is really a multi-dimensional analysis of model fit to real-time data.

This resulting real-time model fit identifier allows for in-situ quantitative analysis of the machine learning models while they are deployed on live networks. Network analysts can use only the aggregate 0-3 scale to activate model retraining, or they can rely on whether one or more individual mathematical techniques is above a threshold, to determine whether to activate model retraining, or for additional situational awareness of their networks.

This solution addresses the previously described problem (among others) of hackers using volume based attacks to flood the human based cyber defense analysts. Volume based attacks, while generating a lot of alert logs, do not necessarily alter the network traffic characteristics (although denial of service attacks can, but these are more obvious to cyber defense defenders). On cyber networks, attacks are a very small percentage of the overall traffic volume. The above use of thresholds for each dimension of mathematical analysis would show that the models still have real-time goodness of fit. Cyber defense analysts then can more accurately determine whether and when they actually need to react to the intrusion detection system alert logs (as opposed to ignoring them as in the previous example).

While the present invention has been disclosed in connection with the presently preferred best modes described herein, it should be understood that the best modes include words of description and illustration, rather than words of limitation. There may be other embodiments which fall within the spirit and scope of the invention as defined by the claims. For example, this invention can be used in detecting obfuscated DNA sequences in normal DNA, for purposes such as cancer detection or seeking causes for genetic diseases or detecting new virus variants or other genetic analysis, or other areas of bio-informatics. For a further example, this invention can be used in detecting a falsely attributed work (forgery) from among a composer's or author's or artist's collected works. For a further example, this invention can be used in detecting obfuscated transactions being used to manipulate financial or other markets, such as insider trading or pump and dump schemes. It is not necessary that the obfuscation of the abnormal data be caused by humans—it could be naturally occurring, such as in evolution of viruses.

Accordingly, no limitations are to be implied or inferred in this invention except as specifically and as explicitly set forth in the claims.

INDUSTRIAL APPLICABILITY

This invention is applicable wherever it is desired to protect computer networks against attacks. This invention is also applicable wherever it is desired to use machine learning sensors to detect obfuscated abnormal data.

What is claimed is:

1. A process for improving sensors that use machine learning models previously trained on previous training data, for defending a computer network against cyber attacks in live network traffic that contains both normal network traffic and said cyber attacks, to determine more accurately whether and when to react to intrusion detection alert logs, comprising:

installing said sensors in said computer network;

determining model fit of said models by applying techniques of anomaly detection, measuring similarity between said live network traffic and said previous training data, and determining model overfit;

assigning thresholds, and aggregating results of whether said models are above or below said thresholds, for each of said techniques of anomaly detection, measuring similarity between said live network traffic and said previous training data, and determining model overfit, to identify model fit in real time of said live network traffic with said previous training data on a scale of model fits;

activating model retraining based on said scale of model fits, wherein said model retraining selects an optimal model for distinguishing between said cyber attacks and said normal network traffic; and reinstalling said optimal model in said sensors, to perform real time evaluation of said live network traffic, including anomaly detection, wherein said model retraining step is performed by:

obtaining samples of said normal network traffic from said network;

providing samples of said cyber attacks from said network or from a repository of cyber attacks, wherein said samples of cyber attacks constitute known attacks;

sample classifying each of said samples as either said normal network traffic or said known attacks, to create ground truths for said samples;

splitting said samples into a training set and a test set, with each of said sets containing samples of said normal network traffic and said known attacks;

using a model generating algorithm to generate a variety of models for distinguishing between said normal network traffic and said known attacks in said training set;

obfuscating a portion of said known attacks in said training set to create obfuscated attack samples;

adding said obfuscated attack samples to said test set to form an enhanced test set;

performing statistical analysis on performance of said models with said enhanced test set to determine intrusion detection capability error; and selecting one of said models that optimizes a desired model parameter as said optimal model.

* * * * *